US007086603B2

(12) United States Patent
Bash et al.

(10) Patent No.: US 7,086,603 B2
(45) Date of Patent: Aug. 8, 2006

(54) DATA COLLECTION SYSTEM HAVING A DATA COLLECTOR

(75) Inventors: Cullen E. Bash, San Francisco, CA (US); David A. Moore, Tomball, TX (US); Chandrakant D. Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 249 days.

(21) Appl. No.: 10/772,318

(22) Filed: Feb. 6, 2004

(65) Prior Publication Data
US 2005/0173549 A1 Aug. 11, 2005

(51) Int. Cl.
*G05D 23/19* (2006.01)
*H05K 7/20* (2006.01)
(52) U.S. Cl. ............... 236/51; 62/180; 62/259.2
(58) Field of Classification Search ............ 236/64, 236/49.3, 51; 62/180, 186, 259.2, 229, 208, 62/185, 178, 228.4
See application file for complete search history.

(56) References Cited

U.S. PATENT DOCUMENTS

| | | | | | |
|---|---|---|---|---|---|
| 5,718,628 | A | * | 2/1998 | Nakazato et al. | 454/184 |
| 6,283,380 | B1 | * | 9/2001 | Nakanishi et al. | 236/49.3 |
| 6,639,794 | B1 | * | 10/2003 | Olarig et al. | 361/687 |
| 2002/0173877 | A1 | * | 11/2002 | Zweig | 700/245 |
| 2004/0139110 | A1 | * | 7/2004 | LeMarca et al. | 707/104.1 |
| 2005/0038562 | A1 | * | 2/2005 | Bash et al. | 700/245 |

* cited by examiner

*Primary Examiner*—Chen Wen Jiang

(57) ABSTRACT

A system for collecting data in a room. The system includes a plurality of sensor devices positioned at various locations in the room. The sensor devices include a sensor configured to detect at least one condition and a controller configured to control the sensor. The system also includes at least one data storage device configured to store the detected at least one condition and an interface mechanism for enabling communication of the stored at least one condition. The system further includes a data collector for interfacing with the interface mechanism to receive the stored at least one condition from the at least one data storage device.

46 Claims, 7 Drawing Sheets

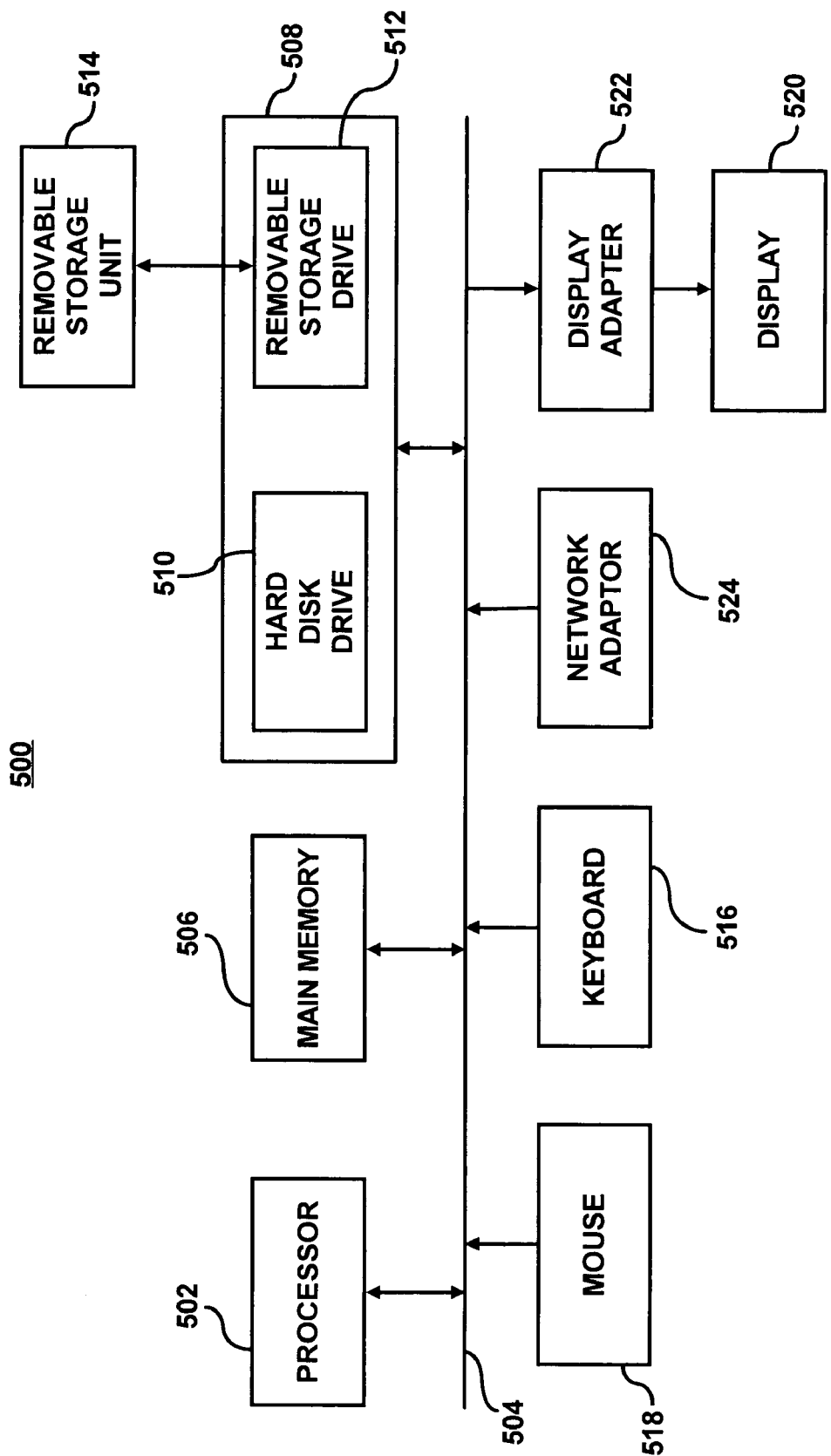

DATA COLLECTION SYSTEM HAVING A DATA COLLECTOR

BACKGROUND OF THE INVENTION

A data center may be defined as a location, for instance, a room, that houses computer systems arranged in a number of racks. A standard rack, for example, an electronics cabinet, is defined as an Electronics Industry Association (EIA) enclosure, 78 in. (2 meters) high, 24 in. (0.61 meter) wide and 30 in. (0.76 meter) deep. These racks are configured to house a number of computer systems, about forty (40) systems, with future configurations of racks being designed to accommodate 200 or more systems. The computer systems typically include a number of printed circuit boards (PCBs), mass storage devices, power supplies, processors, micro-controllers, and semi-conductor devices, that dissipate relatively significant amounts of heat during their operation. For example, a typical computer system comprising multiple microprocessors dissipates approximately 250 W of power. Thus, a rack containing forty (40) computer systems of this type dissipates approximately 10 KW of power.

The power required to transfer the heat dissipated by the components in the racks to the cool air contained in the data center is generally equal to about 10 percent of the power needed to operate the components. However, the power required to remove the heat dissipated by a plurality of racks in a data center is generally equal to about 50 percent of the power needed to operate the components in the racks. The disparity in the amount of power required to dissipate the various heat loads between racks and data centers stems from, for example, the additional thermodynamic work needed in the data center to cool the air. In one respect, racks are typically cooled with fans that operate to move cooling air across the heat dissipating components; whereas, data centers often implement reverse power cycles to cool heated return air. The additional work required to achieve the temperature reduction, in addition to the work associated with moving the cooling fluid in the data center and the condenser, often add up to the 50 percent power requirement. As such, the cooling of data centers presents problems in addition to those faced with the cooling of the racks.

Conventional data centers are typically cooled by operation of one or more air conditioning units. For example, compressors of air conditioning units typically consume a minimum of about thirty (30) percent of the required operating energy to sufficiently cool the data centers. The other components, for example, condensers and air movers (fans), typically consume an additional twenty (20) percent of the required total operating energy. As an example, a high density data center with 100 racks, each rack having a maximum power dissipation of 10 KW, generally requires 1 MW of cooling capacity. Air conditioning units with a capacity of 1 MW of heat removal generally requires a minimum of 300 KW input compressor power in addition to the power needed to drive the air moving devices, for instance, fans and blowers. Conventional data center air conditioning units do not vary their cooling fluid output based on the distributed needs of the data center. Instead, these air conditioning units generally operate at or near a maximum compressor power even when the heat load is reduced inside the data center.

The substantially continuous operation of the air conditioning units is generally designed to operate according to a worst-case scenario. For example, air conditioning systems are typically designed around the maximum capacity and redundancies are utilized so that the data center may remain on-line on a substantially continual basis. However, the computer systems in the data center may only utilize around 30–50% of the maximum cooling capacity. In this respect, conventional cooling systems often attempt to cool components that may not be operating at a level which may cause their temperatures to exceed a predetermined temperature range. Consequently, conventional cooling systems often incur greater amounts of operating expenses than may be necessary to sufficiently cool the heat generating components contained in the racks of data centers.

Another problem associated with the cooling of data centers involves the expense and difficulty in measuring the environmental conditions, e.g., temperature, humidity, air flow, etc., within and around the racks. Although it has been found that the use of temperature sensors, e.g., thermocouples, located at various locations throughout the data center has been a relatively accurate manner of detecting temperatures, this practice has also been found to be relatively restrictive due to the difficulty and costs associated with this implementation. A relatively large number of sensors typically must be implemented to adequately detect the environmental conditions throughout the data center. In addition, these sensors are typically configured to substantially continuously transmit detected conditions to a controller. One result of the use of a relatively large number of sensors is that they produce an extremely large amount of data.

The sensors are typically wired to a power source and to a network for transmitting information. Therefore, when the data center layout changes, e.g., racks or components are added, removed or re-arranged, the sensors must also be re-wired. Because data centers are known to include a large number of sensors, re-wiring the sensors requires a great deal of time and manual input which are associated with relatively high operating costs.

One way to alleviate some of the time and costs associated with changing the data center layout has been through the use of wireless sensor arrays. However, there are certain drawbacks associated with the use of sensor arrays that wirelessly transmit information. For instance, the information may be transmitted to locations outside of the data center and therefore may be intercepted by outside systems. This may occur because the sensors may be calibrated to transmit signals to a system located relatively distant from the sensor locations, e.g., across a relatively large data center.

Another drawback to the use of certain known wireless sensors is the costs associated with their implementation and operation. Wireless sensors capable of transmitting information a distance sufficient to reach a desired location in the data center are typically expensive and complicated. In addition, these sensors typically require relatively large amounts of power during their operations.

SUMMARY OF THE INVENTION

According to an embodiment, the present invention pertains to a system for collecting data in a room. The system includes a plurality of sensor devices positioned at various locations in the room. The sensor devices include a sensor configured to detect at least one condition and a controller configured to control the sensor. The system also includes at least one data storage device configured to store the detected at least one condition and an interface mechanism for enabling communication of the stored at least one condition. The system further includes a data collector for interfacing with the interface mechanism to receive the stored at least one condition from the at least one data storage device.

BRIEF DESCRIPTION OF THE DRAWINGS

Features of the present invention will become apparent to those skilled in the art from the following description with reference to the figures, in which:

FIG. 5 illustrates an exemplary computer system, according to an embodiment of the invention.

DETAILED DESCRIPTION OF THE INVENTION

Figure 1A:
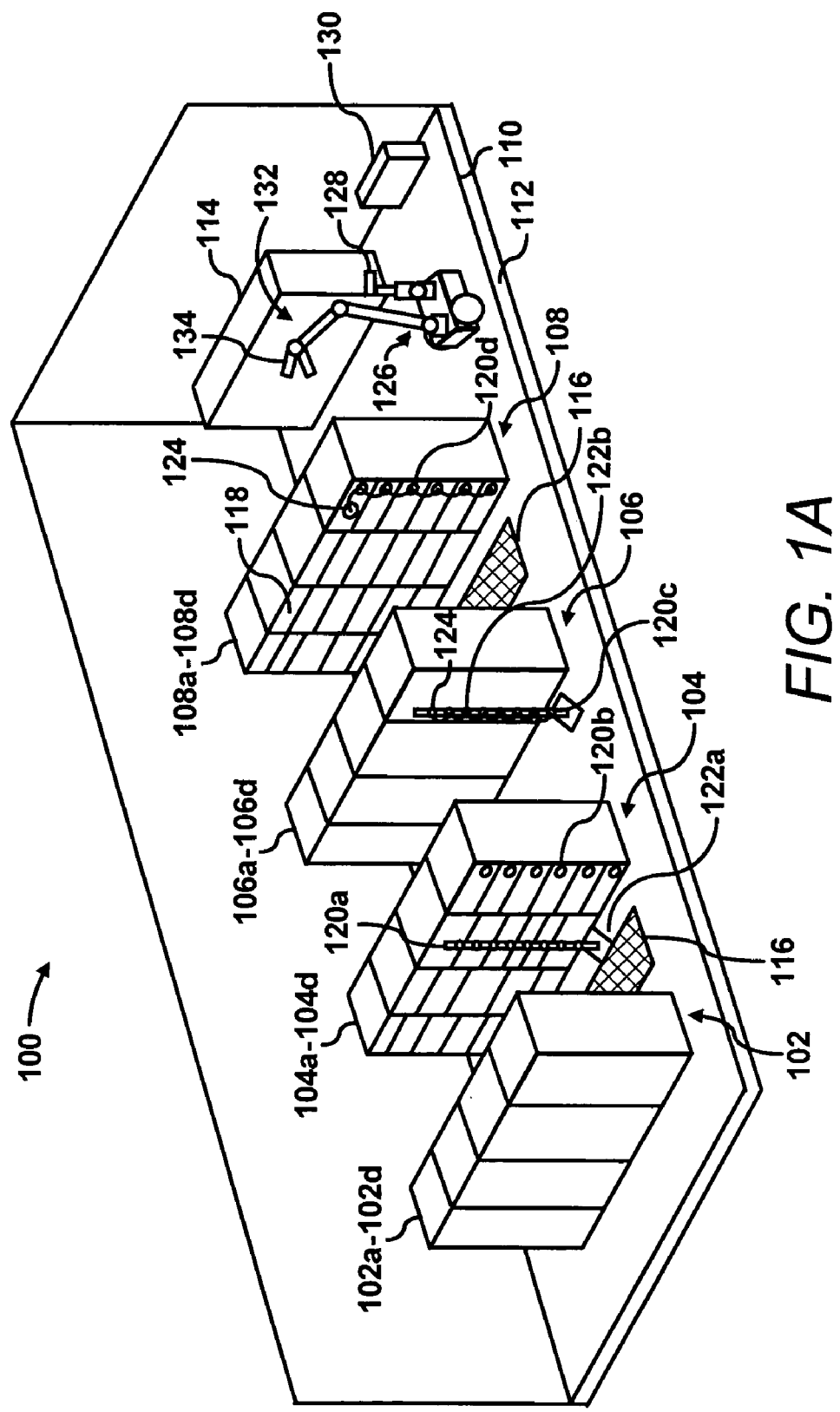
FIG. 1A shows a simplified perspective view of a room, e.g., a data center, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Throughout the present disclosure, reference is made to "cooling fluid" and "heated cooling fluid". For purposes of simplicity, "cooling fluid" may generally be defined as air that has been cooled by a cooling device, e.g., an air conditioning unit. In addition, "heated cooling fluid" may generally be defined as cooling fluid that has been heated. It should be readily apparent, however, that the terms "cooling fluid" are not intended to denote air that only contains cooled fluid and that "heated cooling fluid" only contains cooling fluid that has been heated. Instead, embodiments of the invention may operate with air that contains a mixture of heated cooling fluid and cooling fluid. In addition, cooling fluid and heated cooling fluid may denote gases other than air, e.g., refrigerant and other types of gases known to those of ordinary skill in the art that may be used to cool electronic components.

According to embodiments of the invention, a data collection system includes a plurality of sensor devices configured to detect one or more conditions at various locations in a room. The data collection system also includes a data collector configured to receive the one or more conditions detected by the sensor devices. The data collector is configured to interface with the sensor devices or another interface apparatus configured to receive the detected one or more conditions. The data collector may store the information received from the sensor devices and may uploaded the information at an upload location where the information may be uploaded to a computer system configured to operate as an energy manager and control one or more cooling system components. In one example, the data collector may comprise a hand-held device, for instance, a personal digital assistant, a laptop computer, or some other portable computing device. In another example, the data collector may be configured on a robotic device configured to traverse the room. In the second example, the information received by the data collector may be implemented by the robotic device, which may operate as the energy manager. In any respect, the computer system and/or the robotic device may substantially base cooling system control decisions upon the information received from the sensor devices.

Through implementation of various embodiments of the invention, information pertaining to conditions at various locations of a room may be detected through use of relatively simple and inexpensive sensor devices. In addition, the detected conditions may be communicated effectively and in a secure manner to an energy manager configured to control various conditions in the room. In one respect, the data collector may be employed by persons in the room to manually collect information from the sensor devices. In another respect, a robotic device may be employed to provide data collection and transport between the various sensor devices and a computer system configured to operate as the energy manager. Therefore, data from the sensor devices need not be transmitted across relatively large distances for the information to be received by the computer system. In one respect, the data may be communicated while substantially avoiding issues related to security problems, e.g., data interception. In addition, the sensor devices also need not be wired to a system configured to operate as an energy manager. Therefore, the amount of time and the costs associated with operating a room containing electronic components may thus be reduced compared with conventional systems.

With reference first to FIG. 1A, there is shown a simplified perspective view of a room 100, e.g., a data center, according to an embodiment of the invention. The terms "data center" are generally meant to denote a room or other space and are not meant to limit the invention to any specific type of room where data is communicated or processed, nor should it be construed that use of the terms "data center" limits the invention in any respect other than its definition hereinabove.

The room 100 depicted in FIG. 1A represents a generalized illustration and other components may be added or existing components may be removed or modified without departing from the scope of the invention. For example, the room 100 may include any number of racks and various other apparatuses known to be housed in data centers. Thus, although the room 100 is illustrated as containing four rows of racks 102–108, it should be understood that the room 100 may include any number of racks, e.g., 100 racks, without departing from the scope of the invention. The depiction of four rows of racks 102–108 is thus for illustrative and simplicity of description purposes only and is not intended to limit the invention in any respect.

The room 100 is depicted as having a plurality of racks 102–108, for instance, electronics cabinets, aligned in substantially parallel rows. The racks 102–108 are illustrated as having open front sides such that the components 118 housed therein are visible. It should, however, be understood that embodiments of the invention may be practiced with racks having panels that cover the front sides of the racks 102–108 without departing from the scope of the invention. The rows of racks 102–108 are shown as containing four racks (a–d) positioned on a raised floor 110. A plurality of wires and communication lines (not shown) may be located in a space 112 beneath the raised floor 110. The space 112 may also function as a plenum for delivery of cooling fluid from a computer room air conditioner (CRAC) 114 to the racks 102–108. The cooling fluid may be delivered from the space 112 to the racks 102–108 through vent tiles 116 located between some or all of the racks 102–108. The vent tiles 116 are shown in FIG. 1A as being located between racks 102 and 104 and 106 and 108.

The racks 102–108 are generally configured to house a plurality of components 118, e.g., computers, servers, monitors, hard drives, disk drives, etc., designed to perform various operations, e.g., computing, switching, routing, displaying, etc. These components 118 may comprise subsystems (not shown), for example, processors, micro-controllers, high-speed video cards, memories, semi-conductor devices, and the like to perform these functions. In the performance of these electronic functions, the components 118, and therefore the subsystems, generally dissipate relatively large amounts of heat. Because the racks 102–108 have generally been known to include upwards of forty (40) or more subsystems, they may transfer substantially large amounts of heat to the cooling fluid to maintain the subsystems and the components 118 generally within predetermined operating temperature ranges.

A relatively small number of components 118 are illustrated as being housed in the racks 102–108 for purposes of simplicity. It should, however, be understood that the racks 102–108 may include any number of components 118, e.g., forty or more components 118, without departing from the scope of the invention. In addition, although the racks 102–108 are illustrated as containing components 118 throughout the heights of the racks 102–108, it should be understood that some or all of the racks 102–108 may include slots or areas that do not include components 118 without departing from the scope of the invention.

Provided at various locations of the room 100 are a plurality of sensor devices 120a–120d. Although the sensor devices 120a–120d are illustrated as being positioned vertically with respect to each other, the sensor devices 120a–120d may be positioned in any reasonably suitable configuration with respect to each other, for instance, horizontally, diagonally, etc. In addition, some or all of the sensor devices 120a–120d may be positioned at various other locations in the room 100 as well as in separate arrangements from each other without departing from the scope of the invention. Thus, for instance, one or more of the sensor devices 120a–120d may be positioned separately and independently from others of the sensor devices 120a–120d.

As will be described in greater detail hereinbelow, the sensor devices 120a–120d include various components designed to perform various functions. In general, however, the sensor devices 120a–120d are designed to detect at least one condition, for instance, temperature, pressure, humidity, airflow direction, airflow velocity, etc., and to store the detected at least one condition. The sensor devices 120a–120d may comprise any reasonably suitable sensor configuration capable of performing one or more aspects of the invention. An example, of a suitable sensor device is the IBUTTON available from DALLAS SEMICONDUCTOR of Dallas, Tex. or MAXIM INTEGRATED PRODUCTS, Inc. of Sunnyvale, Calif.

The sensor devices 120a and 120c are illustrated as being positioned in a vertically oriented fashion on poles 122a and 122b. In this regard, each of the sensor devices 120a and 120c is configured to detect the at least one condition at a respective height. For instance, the sensor devices 120a located on a lower portion of the pole 122a may detect the temperature of the cooling fluid supplied from the vent tile 116. As another example, the sensor devices 120a located on a higher portion of the pole 122a may detect the temperature of the cooling fluid delivered to components 118 located at a higher position in the rack 104b. As a yet further example, the sensor devices 120c may detect the temperature of the cooling fluid exhausted from the rack 106a at various heights.

The sensor devices 120a and 120c may be attached to the poles 122a and 122b through any reasonably suitable means, for instance, mechanical fasteners, hook and loop fasteners, adhesives, etc. The sensor devices 120a and 120c may also be attached through use of brackets that enable the sensor devices 120a and 120b to be removed and or replaced. In addition, or alternatively, the poles 122a and 122b may include features to enable placement and support of the sensor devices 120a and 120c. The features may include, for instance, slots or other designs configured to support the sensor devices 120a and 120c. Thus, for example, sensor devices configured to perform various functions may be added or replaced with relative ease. The poles 122a and 122b may also comprise any reasonably suitable material, for instance, wood, plastic, metal, combinations thereof, etc. In addition, the poles 122a and 122b may be substantially fixed in place, for instance, with mechanical fasteners, adhesives, welding, etc., or they may be movable.

The sensor devices 120b and 120d are illustrated as being positioned on various racks 104a and 108a. More particularly, the sensor devices 120b and 120d are illustrated as being positioned adjacent respective components 118. In this regard, the sensor devices 120b and 120d are configured to detect the at least one condition at various heights along the respective racks 104a and 108a to which they are attached. The sensor devices 120b and 120d may be attached through any reasonably suitable means to the various locations on the racks 104a and 108a. For instance, the racks 104a and 108a may include brackets (not shown) configured to removably support the sensor devices 120b and 120d. Alternatively, the sensor devices 120b and 120d may be attached to the racks 104a and 108a through use of mechanical fasteners, adhesives, hook and loop fasteners, etc. Thus, for example, sensor devices configured to perform various functions may be added or replaced with relative ease.

As illustrated in FIG. 1A, the sensor devices 120c and 120d are wired to each other and/or to an interface apparatus 124. In this example, data collected by the sensor devices 120c and 120d may be communicated to other sensor devices to which the sensor devices 120c, 120d are wired. In addition, the data collected by the sensor devices 120c, 120d may be communicated to the interface apparatus 124. In one example, the interface apparatus 124 may include a memory for storing the information received from the sensor devices 120c, 120d. In addition, the interface apparatus 124 may include an interface mechanism for data transfer between the interface apparatus 124 and a data collector 128. In another example, the interface apparatus 124 may operate as a means for the data collector 128 to access information stored in the sensor devices 120c, 120d.

The sensor devices 120c and 120d may be respectively configured, for instance, daisy chained together, under a ONE WIRE scheme available from DALLAS SEMICONDUCTOR of Dallas, Tex. or MAXIM INTEGRATED PRODUCTS, Inc. of Sunnyvale, Calif. Under the ONE WIRE scheme, control, signaling and power are supplied through a double wire connection, one for ground and the other for control, signaling, and power. In addition, the interface apparatus 124 may include a tiny internet interface (TINI), a platform developed by DALLAS SEMICONDUCTOR/MAXIM, which generally operates as a controller for the sensor devices 120a–120d. Alternatively, the supply of control, signals and power to the sensor devices 120c and 120d may performed through any number of wires and with any reasonably suitable controller. In addition, the sensor devices 120a–120d may be equipped with individual batteries, for instance, lithium batteries.

As described briefly hereinabove, the information obtained by the sensor devices 120a–120d may be downloaded or otherwise collected through use of a data collector 128. The data collector 128 generally includes components designed to enable communications with either the sensor devices 120a–120d or to the interface apparatus 124. In this regard, the data collector 128 may include a collector interface mechanism (not shown) configured to interface with either the sensor devices 120a–120d or the interface apparatus 124. The data collector 128 may also comprise a portable device, for instance, a portable digital assistant, a laptop computer, or some other portable computing device, including a memory for storing the collected information.

In one example, the data collector 128 may be implemented by persons to manually collect information from the sensor devices 120a–120d. Manners in which the information may be transferred from the sensor devices 120a–120d are described in greater detail hereinbelow with respect to the robotic device 126. In this example, the information may be manually collected and transferred or downloaded to a computer system 130. Manners in which the information may be transferred from the data collector 128 to the computer system 130 is described in greater detail hereinbelow with respect to the robotic device 126. The computer system 130 may use this information to control one or more of the cooling system components, for instance, the CRAC unit 114, the vent tiles 116, etc. In this regard, the computer system 130 may substantially function as an energy manager for the room 100.

In another example, which is shown in FIG. 1A, the data collector 128 may be positioned on a robotic device 126 configured to traverse the room 100. The robotic device 126 may include means to enable the robotic device 126 to travel to various areas of the room 100. The robotic device 126 may comprise a configuration and operate in manners similar to those described in co-pending and commonly assigned U.S. patent application Ser. No. 10/446,867 filed on May 29, 2003, and entitled "DATA CENTER ROBOTIC DEVICE". The disclosure contained in that application is hereby incorporated by reference in its entirety. Additional components associated with the robotic device 126 are described in greater detail hereinbelow.

The robotic device 126 is generally configured to communicate with either one or more of the sensor devices 120a–120d directly or with an interface apparatus 124. To enable communications between the robotic device 126 and the interface apparatus 124, the robotic device 126 is equipped with the data collector data collecor 128. Any reasonably suitable known communications means may be employed to enable communications between the interface apparatus 124 and the data collector data collector 128. By way of example, the communications means may comprise an Ethernet-type connection between the interface apparatus 124 and the data collector 128. As another example, the communications means may be effectuated through a wired protocol, such as IEEE 802.3, etc., or wireless protocols, such as IEEE 802.11b, 802.11g, wireless serial connection, Bluetooth, etc., or combinations thereof.

As will be explained in greater detail hereinbelow, the data collector data collector 128 may be positioned on a movable platform of the robotic device 126. In one regard, through manipulation of the movable platform, the data collector data collector 128 may be positioned at various heights and/or angles with respect to the robotic device 126. Therefore, the data collector data collector 128 may interface with interface mechanisms 124 located at various heights and angles with respect to the robotic device 126. According to this example, the robotic device 126 may collect data from a number of sensor devices 120c and 120d through a single connection, for instance, the interface mechanism 124.

According to another example of the invention, the sensor devices 120a–120d may be equipped with interface mechanisms (not shown) designed to enable data transfer between the sensor devices 120a–120d and the robotic device 126. For instance, the interface mechanisms of the sensor devices 120a–120d may comprise a design which enables the interfacing or mating between the interface mechanisms and the data collector data collector 128. Under this example, the interface apparatus 124 may be omitted as information may be exchanged directly between the robotic device 126 and the sensor devices 120a–120d. In addition, the sensor devices 120a–120d may be equipped with data storage devices configured to store the detected at least one condition information. Moreover, the sensor devices 120a–120d may receive power through a wired connection to a power source, for instance, AC or DC power, or the sensor devices 120a–120d may include batteries as the power sources.

Communications between the interface mechanisms of the sensor devices 120a–120d and the data collector data collector 128 may be effectuated through, for instance, an Ethernet-type connection or through a wired protocol, such as IEEE 802.3, etc., or wireless protocols, such as IEEE 802.11b, 802.11g, wireless serial connection, Bluetooth, etc., or combinations thereof. As another example, if the sensor devices 120a–120d comprise IBUTTONS, the data collector data collector 128 may comprise an IBUTTON reader which is also commercially available from DALLAS SEMICONDUCTOR/MAXIM INTEGRATED PRODUCTS.

According to another example, the robotic device 126 may be equipped with a plurality of data collectors 128 positioned, for instance, at various heights with regard to the robotic device 126. The data collectors 128 may, for instance, be positioned on a substantially fixed or movable pole extending from a base of the robotic device 126. In one regard, the data collectors 128 may be positioned at heights to substantially match the heights of the sensor devices 120a–120d. Accordingly, the data collectors 128 may be implemented to substantially simultaneously interface with a plurality of sensor devices 120a–120d or to interface with sensor devices 120a–120d and/or interface apparatuses 124 located at various heights.

The robotic device 126 may contain a memory configured to store the data received from the interface apparatus 124 and/or the sensor devices 120a–120d. In one example, the robotic device 126 may operate as an energy manager configured to control operations of various cooling system components, for instance, the CRAC unit 114, vent tiles 116, devices for substantially controlling the flow of cooling fluid into the racks 102–108, e.g., those devices described in co-pending and commonly assigned U.S. patent application Ser. Nos. 10/425,621 and 10/425,624, both of which were filed on Apr. 30, 2003, the disclosures of which are hereby incorporated by reference in their entireties, etc. In another example, the robotic device 126 may operate as a means for communicating the at least one condition detected by the sensor devices 120a–120d to, for instance, a computer system 130 configured to control operations of the various cooling system components. In any respect, the conditions detected by the sensor devices 120a–120d may be employed in controlling the various cooling system components. Manners in which the robotic device 126 and/or the computer system 130 may operate the various cooling system components are described, for instance, in co-pending and commonly assigned U.S. patent application Ser. No. 10/721,264 filed on Nov. 26, 2003, the disclosure of which is hereby incorporated by reference in its entirety.

The computer system 130 may also operate as a base station for the robotic device 126. In one regard, the computer system 130 may provide instructions to the robotic device 126. These instructions may include, for instance, the routes the robotic device 126 is to follow in the room 100 and may be based upon various routing algorithms as described, for instance, in the Ser. No. 10/721,264 application. As further described in that application, the computer system 130 may also include systems for recharging a battery of the robotic device 126. In one respect, the computer system 130 may include a charging pad and the robotic device 126 may include conductive elements configured to engage the charging pad and to receive electrical charge therethrough. The robotic device 126 may thus be configured to travel to the computer system 130 to either communicate with the computer system 130 or to recharge its battery.

In addition, communications between the robotic device 126 and the computer system 130 may be effectuated through a wired protocol, such as IEEE 802.3, etc., or wireless protocols, such as IEEE 802.11b, 802.11g, wireless serial connection, Bluetooth, etc., or combinations thereof. If a wired protocol is implemented, the data collector 128 be designed to create a hardwire connection to the computer system 130, which may also include an interface mechanism (not shown) complementary to the data collector 128. If a wireless protocol is implemented, the robotic device 126 and the computer system 130 may be configured or otherwise programmed to transmit signals to relatively short distances, for instance, within a few feet. In this regard, wireless communications between the robotic device 126 and the computer system 130 may be effectuated in manners such that their signals are substantially prevented from being transmitted to locations outside of the room 100, therefore reducing the possibilities of unwanted signal interceptions.

The robotic device 126 may also include an arm assembly 132 including a manipulator 134. Although the manipulator 134 may be used for various purposes, according to an example of the invention, the robotic device 126 may employ the arm assembly 132 and the manipulator 134 to position or re-position the sensor devices 120a, 120c located on the poles 122a, 122b. In this regard, the poles 122a, 122b may be movable and comprise a sufficiently low weight to enable the robotic device 126 to move the poles 122a, 122b. In one example, the robotic device 126 may be capable of grasping a plurality of poles 122a, 122b and positioning them at various locations of the room 100.

Figure 1B:
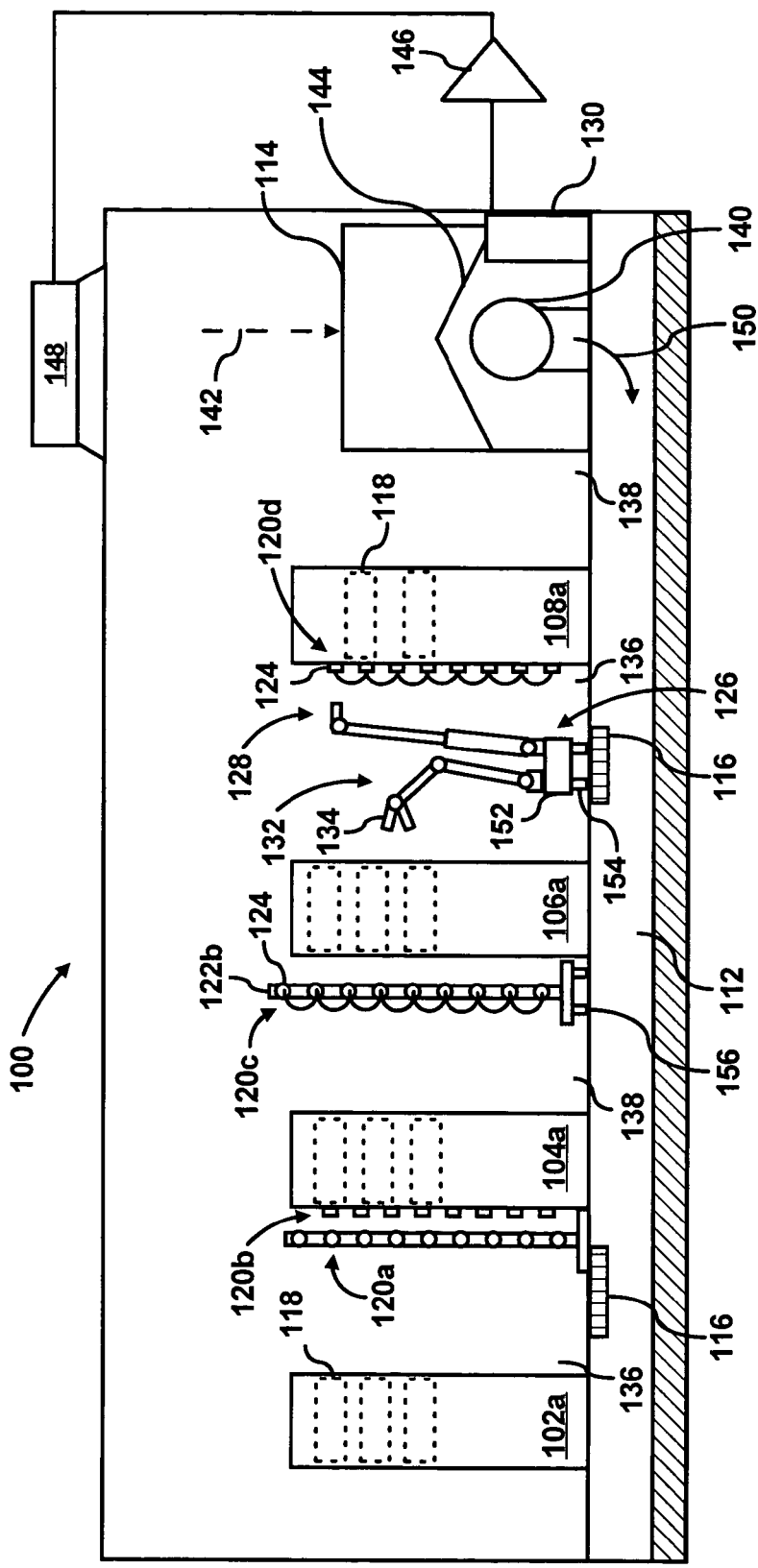
FIG. 1B shows a simplified illustration of a side elevational view of the room shown in FIG. 1A, according to an embodiment of the invention.

With reference now to FIG. 1B, there is shown a simplified illustration of a side elevational view of the room 100 shown in FIG. 1A, according to an embodiment of the invention. In FIG. 1B, racks 102a, 104a, 106a, and 108a are visible. In addition, some of the components 118 are visible in cross-section through the sides of the racks 102a, 104a, 106a, and 108a. A more detailed description of the elements illustrated with respect to FIG. 1B may be found in commonly assigned U.S. Pat. No. 6,574,104, filed on Oct. 5, 2001, which is hereby incorporated by reference in its entirety.

The areas between the racks 102 and 104 and between the racks 106 and 108 may comprise cool aisles 136. These aisles are considered "cool aisles" because they are configured to receive cooling fluid from the vents 116. In addition, the racks 102–108 are positioned to receive cooling fluid from the cool aisles 136. The aisles between the racks 104 and 106, and on the rear sides of racks 102 and 108, are considered hot aisles 138. These aisles are considered "hot aisles" because they are positioned to receive cooling fluid heated by the components 118 in the racks 102–108.

As described hereinabove, the CRAC 114 receives and cools heated cooling fluid. In addition, the CRAC 114 supplies the racks 102–108 with cooling fluid that has been cooled, e.g., cooled or chilled air, through, for example, a process as described below. The CRAC 114 generally includes a fan 140 for supplying cooling fluid (e.g., air) into the space 112 (e.g., plenum) and/or drawing heated cooling fluid from the room 100. In operation, the heated cooling fluid (shown as the arrow 142) enters into the CRAC 114 and is generally cooled by operation of a cooling coil 144, a compressor 146, and a condenser 148, in a manner generally known to those of ordinary skill in the art. In terms of cooling system efficiency, it is generally desirable that the return air is composed of the relatively warmest portion of air in the room 100. The CRAC 114 may include components capable of varying the temperature and/or the volume flow rate of the cooling fluid delivered (shown as the arrow 150) into the space 112 as described in the co-pending Ser. No. 10/721,264 patent application. In addition, aspects of the invention may be operated with constant speed compressors and/or constant speed fans as described in co-pending and commonly assigned U.S. application Ser. No. 10/303,761, filed on Nov. 26, 2002 and U.S. application Ser. No. 10/351,427, filed on Jan. 27, 2003, which are hereby incorporated by reference in their entireties.

Aspects of the invention may also be practiced in accordance with various principles disclosed in co-pending and commonly assigned U.S. patent application Ser. Nos. 10/262,879, filed on Oct. 3, 2002, No. 10/210,040, filed on Aug. 2, 2002, the disclosures of which are hereby incorporated by reference in their entireties.

Although reference is made to the use of a fan 140 to draw heated cooling fluid from the room 100, it should be understood that any other reasonably suitable manner of cooling fluid removal may be implemented without departing from the scope of the invention. By way of example, a separate fan or blower (not shown) may be employed to draw heated cooling fluid from the room 100.

As disclosed in the above-identified co-pending applications, through operation of the vent tiles 116, the above-described devices, and/or the CRAC 114, global and zonal control of the cooling fluid flow and temperature may substantially be achieved. For instance, the flow regulating devices, e.g., louver systems and angled panels, generally provide local or rack level control of cooling fluid flow and the vent tiles 116 generally provide localized or zonal control of the cooling fluid flow to one or more of the racks 102–108. In addition, the CRAC 114 generally provides global control of the cooling fluid flow and temperature, e.g., cooling fluid having various characteristics to a plurality of racks, throughout various portions of the room 100. By virtue of the zonal and global control of the cooling fluid, the amount of energy consumed by the CRAC 114 in maintaining the components of the racks 102–108 within predetermined operating temperature ranges may substantially be reduced in comparison with conventional data center cooling systems.

As stated hereinabove, either the robotic device 126 or the computer system 130 is configured to control the operations of the various cooling system components. In controlling the operations of these cooling system components, the robotic device 126 and/or the computer system 130 may employ condition information obtained from the sensor devices 120a–120d.

As illustrated in greater detail in FIG. 1B, the robotic device 126 is generally composed of a vehicle base 152 having a plurality of wheels 154 to enable travel of the robotic device 126 through the room 100. An arm assembly 132 is attached to the vehicle base 152 and may be rotatable and maneuverable into various positions with respect to the vehicle base 152, for example, with six or more degrees of freedom. A variety of components and/or devices, e.g., sensors, cameras, manipulators, interface devices, etc., may be attached at various locations of the arm assembly 132. As described hereinabove, one of the components attached to the arm assembly 132 may include a manipulator 134.

Although the arm assembly 132 has been described as being movable, the arm assembly 132 may be relatively static with respect to the vehicle base 152 without departing from the scope of the invention. In addition, the robotic device 126 may be configured without an arm or with a retractable arm.

The pole 122b is illustrated as containing a plurality of wheels 156. The wheels 156 generally facilitate the placement of the pole 122b and the sensor devices 120b in various locations of the room 100. Thus, in one regard, the robotic device 126 may grasp the pole 122b with the manipulator 134 and drag or push the pole 122b to a desired location.

Figure 2:
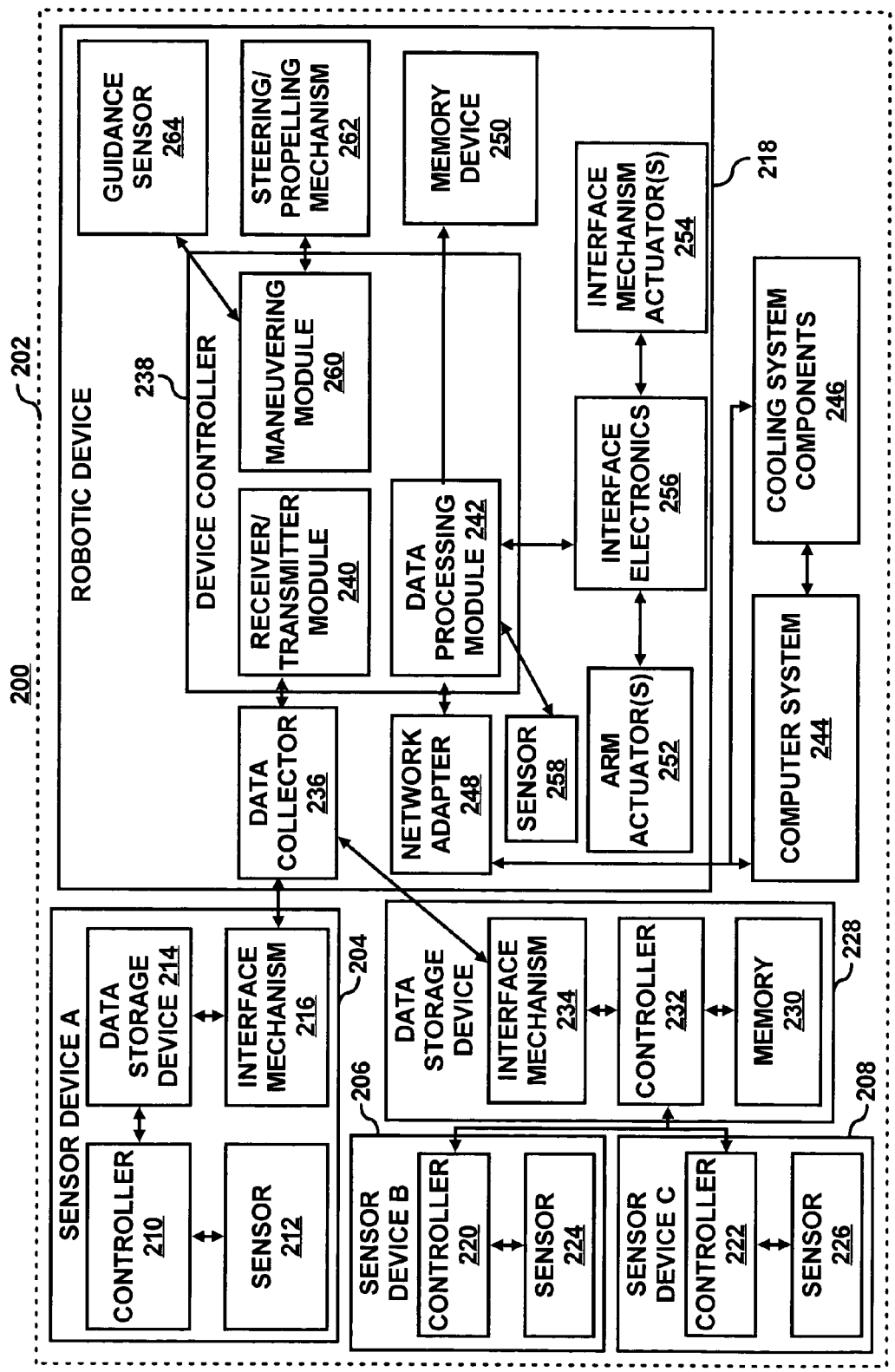
FIG. 2 is an exemplary block diagram of a data collection system according to an embodiment of the invention.

FIG. 2 is an exemplary block diagram 200 of a data collection system 202 according to an embodiment of the invention. It should be understood that the following description of the block diagram 200 is but one manner of a variety of different manners in which such a data collection system 202 may be configured. In addition, it should be understood that the block diagram 200 may include additional components and that some of the components described herein may be removed and/or modified without departing from the scope of the invention. For instance, the block diagram 200 may any number of sensor devices, robotic devices, etc., as well other components which may be implemented in the operations of the data collection system 202.

The data collection system 202 is illustrated as including variously configured sensor devices 204–208 (also indicated as sensor devices A–C). The sensor devices A–C 204–208 are illustrated as comprising various configurations to illustrate various examples of suitable configurations for the sensor devices A–C 204–208. It should, however, be understood that the data collection system 202 is not to be limited to include each of the variously configured sensor devices A–C 204–208. Instead, the data collection system 202 may include either the variously configured sensor devices A–C 204–208 or a single type of sensor device 204–208.

Reference is made first to the sensor device A 204, which generally operates in manners similar to the sensor devices 120a, 120b. In this regard, the sensor device A 204 includes a controller 210 configured to control operations of the sensor device A 204. In this regard, the controller 210 may comprise a microprocessor, a micro-controller, an application specific integrated circuit (ASIC), and the like. In one example, the controller 210 is configured to control operations of a sensor 212 designed to detect at least one condition in a vicinity of the sensor 212, for instance, an area adjacent to the sensor 212. More particularly, the controller 210 may be programmed to operate the sensor 212 at various times or time intervals, to thereby substantially optimize power consumption of the sensor 212 operation as well as the amount of data collected by the sensor 212. The controller 210 may include or access a clock (not shown) to determine when sufficient time has elapsed between sensor 212 operations.

The controller 210 may also receive the sensed data from the sensor 212 and store the received data in a data storage device 214. The data storage device 214 may comprise a traditional memory device, such as, volatile or non-volatile memory, such as DRAM, EEPROM, flash memory, combinations thereof, and the like. In addition to storing the received data in the data storage device 214, the controller 210 may also place a time-stamp on the stored received data. In this regard, when the data is transferred or otherwise communicated from the sensor device A 204, the receiving device may determine the times in which the data was collected.

The sensor device A 204 also includes an interface mechanism 216 for enabling communications between the sensor device A 204 and a data collector 236. In other words, the interface mechanism 216 generally provides a means for enabling access to the data storage device 214 by the data collector 236 to retrieve data stored therein. Although the interface mechanism 216 is illustrated as being in direct communication with the data storage device 214, the interface mechanism 216 may also enable communications between the data collector 236 and the data storage device 214 via the controller 210 without departing from the scope of the invention.

Communications between the interface mechanism 216 of the sensor device A 204 and the data collector 236 may be effectuated through, for instance, an Ethernet-type connection or through a wired protocol, such as IEEE 802.3, etc., or wireless protocols, such as IEEE 802.11b, 802.11g, wireless serial connection, Bluetooth, etc., or combinations thereof. As another example, if the sensor device A 204 comprises an IBUTTON, the data collector 236 may comprise an IBUTTON reader, which is also commercially available from DALLAS SEMICONDUCTOR/MAXIM INTEGRATED PRODUCTS.

Reference is now made to sensor devices B 206 and C 208. Sensor devices B 206 and C 208 may are illustrated as having a relatively different configuration than that of the sensor device A 204. The sensor devices B 206 and C 208 include respective controllers 220, 222, which are similar to and may operate in manners as described hereinabove with respect to the controller 210 of the sensor device A 204. The sensor devices B 206 and C 208 also include respective sensors 224, 226, which are also similar to and may operate in manners as described hereinabove with respect the sensor 212 of the sensor device A 204. However, the controllers 220, 222 of the sensor devices B 206 and C 208 may operate to communicate data received from their respective sensors 224, 226 to a separate data storage device 228. In one respect, the data storage device 228 may be in communication with a plurality of sensor devices B 206 and C 208 and may include a memory 230 configured to store data received from the plurality of sensor devices B 206 and C 208. The memory 230 may include a volatile or non-volatile memory, such as DRAM, EEPROM, flash memory, combinations thereof, and the like.

The data storage device 228 may also include a controller 232 configured to control operations of the data storage device 228. In this regard, the controller 232 may comprise a microprocessor, a micro-controller, an application specific integrated circuit (ASIC), and the like. The controller 232 may include or otherwise be associated with a clock (not shown). The controller 232 may, for instance, access the clock to place a time-stamp on the data received from the sensor devices B 206 and C 208. The controller 232 may place a time-stamp on the data received if, for instance, the sensor devices B 206 and C 208 do not themselves place time-stamps on the data communicated to the data storage device 228.

The data storage device 228 may also include an interface mechanism 234 for enabling communications between the data storage device 228 and the data collector 236. In other words, the interface mechanism 234 generally provides a means for enabling access to the data stored in the memory 238 by the data collector 236. Although the interface mechanism 234 is illustrated as communicating with the memory 228 via the controller 232, the interface mechanism 234 may also enable substantially direct communications between the data collector 236 and the memory 228 without departing from the scope of the invention.

Communications between the interface mechanism 234 of the data storage device 228 and the data collector 236 may be effectuated through, for instance, an Ethernet-type connection or through a wired protocol, such as IEEE 802.3, etc., or wireless protocols, such as IEEE 802.11b, 802.11g, wireless serial connection, Bluetooth, etc., or combinations thereof. As another example, if the data storage device 228 comprises an IBUTTON, the data collector 236 may comprise an IBUTTON reader, which is also commercially available from DALLAS SEMICONDUCTOR/MAXIM INTEGRATED PRODUCTS. In this regard, the data collector 236 may include an interface mechanism having a configuration that is complementary to either or both of the interface mechanisms 216 and 234.

According to another example, the sensor devices B 206 and C 208 may include respective memories configured to store the detected condition information. In this example, the data storage device 228 may operate as a means for enabling interfacing between the data collector 236 and a plurality of sensor devices. More particularly, the data collector 236 may be capable of retrieving information stored in the memories of the sensor devices B 206 and C 208 via the data storage device 228.

The data collection system 202 is depicted with the data collector 236 forming part of a robotic device 218, for instance, the robotic device 126. However, as described hereinabove, the data collector 236 may comprise a separate, portable device capable of being used by persons in the room. In this example, the data collector 236 may include a memory configured to store the information received from the sensor devices A–C 204–208 and/or the data storage device 228.

With reference to the example implementing the robotic device 218, information received from either or both of the interface mechanisms 216 and 234 may be communicated to or otherwise relayed to a device controller 238 of the robotic device 218. The device controller 238 may also comprise a microprocessor, a micro-controller, an application specific integrated circuit (ASIC), and the like. In addition, or alternatively, the device controller 238 may be part of a computer system that is separate from the robotic device 218, for instance, a laptop computer or other computing device. In this example, the computing device may be supported or otherwise carried by the robotic device 218. Some of the operations capable of being performed by the device controller 238 are described in greater detail hereinbelow.

The device controller 238 may include a receiver/transmitter module 240 and a data processing module 242. The receiver/transmitter module 240 may forward information received from one or more of the sensors A–C 204–208 to the data processing module 242. The data processing module 242 may make certain determinations based upon the information received from the receiver/transmitter module 240. Depending upon the configuration and programming of the data collection system 202, the data processing module 242 may be configured to transmit or otherwise provide the information to a computer system 244, for instance, the computer system 130 and/or implement the information to control one or more cooling system components 246.

In a first example, the data processing module 242 may determine whether the robotic device 218 should immediately proceed to the computer system 244 to transfer information received from the receiver/transmitter module 240 or to continue along a plotted route. The data processing module 242 may decide to proceed to the computer system 244 if the received information indicates that, for instance, the temperatures detected by one or more sensor devices A–C 204–208 is above or below a predetermined temperature range. A more detailed description of manners in which the data processing module 242 may make these determinations along with other examples are set forth in the co-pending Ser. No. 10/721,264 application, the disclosure of which is hereby incorporated by reference in its entirety. In addition, when the robotic device is to transfer information to the computer system 244, the data processing module 242 may employ, for instance a network adapter 248 to effectuate the information transfer.

The network adapter 248 may be configured to enable wired or wireless communication between the robotic device 218 and the computer system 244. For instance, communications through the network adapter 248 between the robotic device 218 and the computer system 244 may be effectuated through a wired protocol, such as IEEE 802.3, etc., or wireless protocols, such as IEEE 802.11b, 802.11g, wireless serial connection, Bluetooth, etc., or combinations thereof. The computer system 244 may employ the information received from the robotic device 218 in making cooling system component 246, for instance, the CRAC units 114, the vent tiles 116, etc., operations determinations. In addition, the computer system 244 may be operable to control the cooling system components 246 to vary their operations based upon the determinations made by the computer system 244. A more detailed description of manners in which the computer system 244 may make these determinations along with other examples are set forth in the co-pending Ser. No. 10/721,264 application, the disclosure of which is hereby incorporated by reference in its entirety.

In a second example, the device controller 238 may operate as an energy manager for the cooling system components 246. In this example, the data processing module 242 may determine that one or more of the cooling system components 246 are to be varied in response to the information received from the receiver/transmitter module 240. The data processing module 242 may transmit these changes to the one or more cooling system components 246 through, for instance, the network adapter 248. In addition, the network adapter 248 may be configured to enable wired or wireless communication between the robotic device 218 and the one or more cooling system components 246.

For instance, communications through the network adapter 248 between the robotic device 218 and the one or more cooling system components 246 may be effectuated through a wired protocol, such as IEEE 802.3, etc., or wireless protocols, such as IEEE 802.11b, 802.11g, wireless serial connection, Bluetooth, etc., or combinations thereof. A more detailed description of manners in which the data processing module 242 may make these determinations along with other examples are set forth in the co-pending Ser. No. 10/721,264 application, the disclosure of which is hereby incorporated by reference in its entirety.

The data processing module 242 may also operate to store the information received from the receiver/transmitter module 240 in a device memory 250. The information may be stored in the device memory 250 and may be transmitted or otherwise sent to the computer system 244, for instance, when the robotic device 218 is in a vicinity, for instance, within 4 or more feet from either the computer system 244 or an upload location to the computer system 244. An upload location to the computer system 244 may comprise, for instance, an Ethernet connection to a network to which the computer system 244 is attached. The device memory 250 may also be configured to provide storage of a computer software that provides the functionality of the robotic device 218. The device memory 250 may be implemented as a combination of volatile and non-volatile memory, such as DRAM, EEPROM, flash memory, and the like.

The robotic device 218 may comprise the configuration of the robotic device 126 illustrated in FIGS. 1A and 1B. Thus, the robotic device 218 may include one or more arm actuators 252 for articulating an arm assembly, for instance, the arm assembly 132, into various positions. The arm one or more arm actuators 252 may also manipulate a manipulator, for instance, the manipulator 134. The one or more arm actuators 252 may operate, for instance, to grasp and position various sensor devices positioned on the poles 120a, 120b.

The robotic device 218 may also include one or more interface mechanism actuators 254 for manipulating a data collector, for instance, the data collector 128, and a platform on which the data collector is positioned. For instance, the one or more interface mechanism actuators 254 may be operated to vary the position of the interface mechanism such that it may interface with various located interface mechanisms of the sensor devices 204 and/or the data storage devices 228. In any respect, the arm actuator(s) 224 and the interface mechanism actuator(s) 254 may comprise, for instance, direct current (DC) motors.

The instructions from the device controller 238 to control the arm actuator(s) 252 and/or the interface mechanism actuator(s) 254 may be sent through interface electronics 256. The interface electronics 256 may act as an interface between the device controller 238 and the arm actuator(s) 252 and the interface mechanism actuator(s) 254. By way of example, the interface electronics 256 may vary the voltage supplied to the arm actuator(s) 252 to thereby articulate the manipulator into various positions.

The robotic device 218 may also include a sensor 258 configured to detect one or more condition in an area around the sensor 258. The sensor 258 may be employable to supplement the sensors 212, 224, 226 of the sensor devices A–C 204–208. The sensor 258 may be useful, for instance, because the robotic device 218 is able to move to various locations of the room, the robotic device 218 may detect conditions at locations where, for instance, there may be a gap in the coverage by the sensor devices A–C 204–208. In addition, the sensor 258 may be used to determine, for instance, if measurements obtained by some or all of the sensors 212, 224, 226 are accurate.

The sensor 258 may transmit or otherwise send the obtained information to the device controller 238. The device controller 238 may store this information in the device memory 250. For instance, the device memory 250 may store temperature measurements obtained during a condition detection operation along with the locations of the detections. The device memory 250 may store this information, for instance, in the form of a table, map, etc.

The device controller 238 may also include a maneuvering module 260 configured to control the movements of the robotic device 218. The maneuvering module 260 may instruct a steering/propelling mechanism 262 configured to control the motivation and direction of travel of the robotic device 218. The steering/propelling mechanism 260 may thus comprise actuators configured to vary these aspects of the robotic device 218 travel. In determining manners in which the steering/propelling mechanism 260 are to be operated, the maneuvering module 260 may employ information received from a guidance sensor 264, e.g., a laser guidance tool, sonar tool, a camera assembly, combinations thereof, and the like, configured to detect the distances of objects located within the field of view of the guidance sensor 264. The received information may, for instance, be in the form of detected positions of objects located around the robotic device 218.

The maneuvering module 260 may process the images received from the guidance sensor 264, for instance, with image recognition software. In this regard, the maneuvering module 260 may determine the objects located within the guidance sensor's 264 field of view, whether the object is an avoidable obstacle, and determine a path around the obstacle if it is avoidable. By way of example, the maneuvering module 260 may operate the steering/propelling mechanism 262 to decrease the speed of the robotic device 218 and alter its course in response to an object being detected in the path of the robotic device 218.

In one respect, the device memory 250 may store data/ information pertaining to various operations and sensing algorithms responsive to various inputs. For example, the device memory 250 may store a map of the room layout and the device controller 238 may access the map to determine a route to follow to arrive at various locations in the room.

Although a robotic device 218 and a single computer system 244 have been illustrated in FIG. 2, it should be understood that any number of robotic devices 218 and computer system 244 may be included in the data collection system 202. As an example, a plurality of robotic devices 218 may be employed to relatively simultaneously collect information from a number of sensor devices A–C 204–208. In this regard, the time required to collect information from variously located sensor devices A–C 204–208 may be relatively reduced as compared with use of a single robotic device 218. In another respect, the robotic devices 218 may provide redundancy in providing the data collection function from the sensor devices A–C 204–208.

In yet another respect, the robotic devices 218 may afford increased efficiency in response times as compared with the use of a single robotic device 218. For instance, the robotic devices 218 may be deployed in zones having different thermal characteristics, for instance, various areas of the room that are known to be difficult to maintain within predetermined temperature ranges, etc. As another example, the robotic devices 218 may be deployed according to various time schedules, for instance, one or more robotic devices 218 may be deployed while the batteries of other robotic devices 218 are being charged, etc. In addition, the robotic devices 218 may deployed according to different levels of operation in the room. For instance, the different levels of operation may pertain to various stages of critical operation. In this regard, various robotic devices 218 may be deployed according to the level of critical operation in the room, for instance, the number of robotic devices 218 deployed may increase with increased levels of critical operation and the number of robotic devices 218 deployed may decrease with decreased levels of critical operation.

Figure 3:
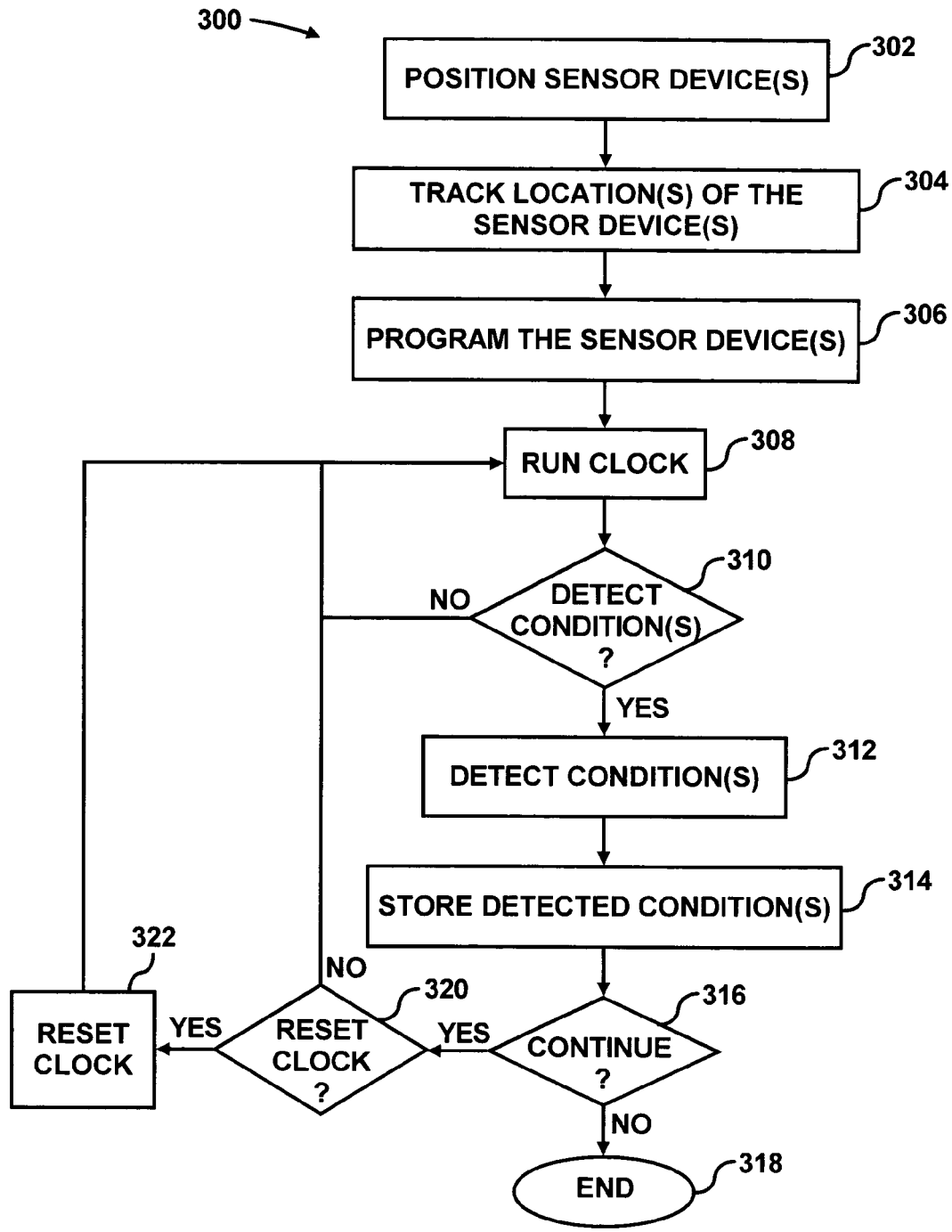
FIG. 3 illustrates an exemplary flow diagram of an operational mode of a method for data collection in a room with a data collector according to an embodiment of the invention.

FIG. 3 illustrates an exemplary flow diagram of an operational mode 300 of a method for data collection in a room with a data collector according to an embodiment of the invention. It is to be understood that the following description of the operational mode 300 is but one manner of a variety of different manners in which an embodiment of the invention may be practiced. It should also be apparent to those of ordinary skill in the art that the operational mode 300 represents a generalized illustration and that other steps may be added or existing steps may be removed, modified or rearranged without departing from the scope of the invention.

The description of the operational mode 300 is made with reference to the block diagram 200 illustrated in FIG. 2, and thus makes reference to the elements cited therein. It should, however, be understood that the operational mode 300 is not limited to the elements set forth in the block diagram 200. Instead, it should be understood that the operational mode 300 may be practiced by a data collection system having a different configuration than that set forth in the block diagram 200.

The operational mode 300 may be initiated by placing one or more sensor devices, for instance, the sensor devices A–C 204–208, at various locations in the room as indicated at step 302. The various locations of the room at which the sensor devices A–C 204–208 are positioned may be selected based upon any number of a plurality of factors. One factor may include the desirability of detecting one or more conditions at the various locations. By way of example, if the room contains one or more locations where the temperatures are known to be relatively high, one or more of the sensor devices A–C 204–208 may be positioned at those one or more locations. Another factor may include condition detection coverage in the room. For instance, the sensor devices A–C 204–208 may be positioned such that they are capable of detecting the one or more conditions over a relatively large area of the room.

The sensor devices A–C 204–208 may be positioned individually at the various locations of the room. Alternatively, the sensor devices A–C 204–208 may be grouped together, for instance, in the manner illustrated and described with respect to the sensor devices 120a–120d in FIGS. 1A and 1B. As described with respect to the sensor devices 120a–120d, the sensor devices 120a–120d may be independently arranged or they may be wired together, for instance, in a daisy chain arrangement. In addition, as shown and described with respect to the sensor devices 120a and 120c, the sensor devices may be arranged on poles 122a and 122b and thus may be positioned along with the poles 122a and 122b.

The positioning of the sensor devices A–C 204–208 at step 302 may be performed either manually or by a robotic device, for instance, the robotic device 126, 218. If step 302 is performed by the robotic device 218, the robotic device 218 may employ its arm assembly 132 and its manipulator 134 to position the sensor devices A–C 204–208. As described hereinabove, the robotic device 218 may be operable to position the sensor devices 120a and 120c by positioning the poles 122a and 122b.

At step 304, the locations of the sensor devices A–C 204–208 may be tracked. That is, for instance, a map, table, or other form of maintaining a log of the sensor device locations may be employed. Step 304 may be performed either manually or by the robotic device 218. In addition, step 304 may be performed before, during or after the sensor devices A–C 204–208 are positioned at step 302. The sensor devices A–C 204–208 may be tracked in a variety of manners without departing from the scope of the invention. For instance, the sensor devices A–C 204–208 may be assigned identifiers to distinguish the sensor devices A–C 204–208 from each other. The identifiers may include, for instance, serial numbers, color coding, etc. In addition, the identifiers may include visual identifiers and/or the sensor devices A–C 204–208 may be configured to transmit their identifiers, for instance, with the detected condition information. Thus, by way of example, the map or table may include the identifiers and their locations which may be correlated to the sensor device A–C 204–208 locations. The assignment of the identifiers to the sensor devices A–C 204–208 may be performed as part of, prior to, or after steps 302 and/or 304 are performed.

At step 306, the sensor devices A–C 204–208 may be programmed to follow a predefined routine. Again, step 306 may be implemented prior to, during, or after steps 302 and/or 304. In addition, the programming of the sensor devices A–C 204–208 may be performed either manually or by the robotic device 218, for instance, through an interface created via the data collector 236. By way of example, the programming of the sensor devices A–C 204–208 may include the timing in which the sensor devices A–C 204–208 are to activate their respective sensors. In one respect, the timing of the conditions detected by the sensor devices A–C 204–208 may be predicated on a plurality of factors. For instance, the timing may be based upon the desired degree of control over the conditions in the room, the reliability of the components contained in the room, the timing between information transfers to the robotic device 218, service level agreements, etc. It should however, be understood that the sensor devices A–C 204–208 may substantially continuously detect the one or more conditions without departing from the scope of the invention.

As another example, the programming of the sensor devices A–C 204–208 may include an association of the sensor devices A–C 204–208 to a data storage device, for instance, the data storage device 228, or to an interface apparatus, for instance, the interface apparatus 124. The association of these devices may include, for instance, which of the data storage device 228 and/or the interface apparatus 124, the respective sensor devices A–C 204–208 are to transmit collected information. In addition, the data storage device 228 and/or the interface apparatus 124 may also be programmed to collect the detected conditions from the sensor devices A–C 204–208 at predefined intervals.

At step 308, the controllers 210, 220, 222 of the sensor devices A–C 204–208 may run a clock, which may be formed as part of the controllers 210, 220, 222 or which may comprise separate components. In any regard, based upon the programming of the controllers 210, 220, 222, the controllers 210, 220, 222 may determine whether to activate their respective sensors 212, 224, 226 and detect the one or more conditions at step 310. If it is determined that an insufficient amount of time has elapsed, the controllers 210, 220, 222 may continue to run the clock until it is time to activate their respective sensors 212, 224, 226. For those controllers 210, 220, 222 that determine that it is time to detect the one or more conditions, those controllers 210, 220, 222 may activate their respective sensors 212, 224, 226 to detect the one or more conditions as indicated at step 312.

It should be understood that some or all of the sensor devices A–C 204–208 may be programmed differently such that they are configured to activate their sensors 212, 224, 226 at various times. For instance, those sensor devices A–C 204–208 positioned to detect the one or more conditions at areas of relatively greater criticality may be programmed to detect the one or more conditions more frequently as compared to other sensor devices A–C 204–208. As further examples, the differences in programming between the sensor devices A–C 204–208 may be based upon the desired degree of control over the associated conditions, the reliability of the components in the respective vicinities of the sensor devices A–C 204–208, the timing between information transfers to the robotic device 218, service level agreements, etc. Accordingly, some of the sensor devices A–C 204–208 may detect the one or more conditions while others of the sensor devices A–C 204–208 may determine that insufficient time has elapsed to detect the one or more conditions.

The detected one or more conditions may be stored in a data storage device at step 314. As indicated hereinabove, the data storage device, for instance, the data storage device 214, may form part of the sensor device A 204. In addition, or alternatively, the data storage device, for instance, the data storage device 228, may form a separate memory configured to receive data from one or more sensor devices B, C 206, 208. In any respect, the detected one or more conditions may be stored along with time-stamps indicating the times when the one or more conditions were detected. In addition, the detected one or more conditions may be stored with the identifier of the sensor device A–C 204–208 that detected the one or more conditions.

At step 316, one or more of the controllers 210, 220, 222 may determine whether to continue the operational mode 300. For the controllers 210, 220, 222 that determine that the operational mode 300 is to be discontinued, e.g., a time period expires, the components in the room are powered down, the operational mode 300 is manually discontinued, etc., the operational mode 300 may end as indicated at step 318. In one respect, one or more of the controllers 210, 220, 222 may determine that the operational mode 300 is to be discontinued if, for instance, they have performed a preset number of detections, they have operated for a predetermined length of time, etc.

For the controllers 210, 220, 222 that determine that the operational mode 300 is to continue, the controllers 210, 220, 222 may determine whether to reset their clocks at step 320. If they determine that their clocks are to be reset, they may reset their clocks at step 322. Steps 320 and 322 may be optional, for instance, in situations where the clocks of the controllers 210, 220, 222 are configured to run substantially continuously. In these situations, the controllers 210, 220, 222 may be configured to detect the one or more conditions at preset times during the day whereas the controllers 210, 220, 222 having clocks which are reset may detect the one or more conditions at preset intervals of time.

In any event, for the controllers that 210, 220, 222 determine that the operational mode 300 is to continue, they may repeat steps 308–322 until they determine that the operational mode 300 is to be discontinued at step 316.

Figure 4A:
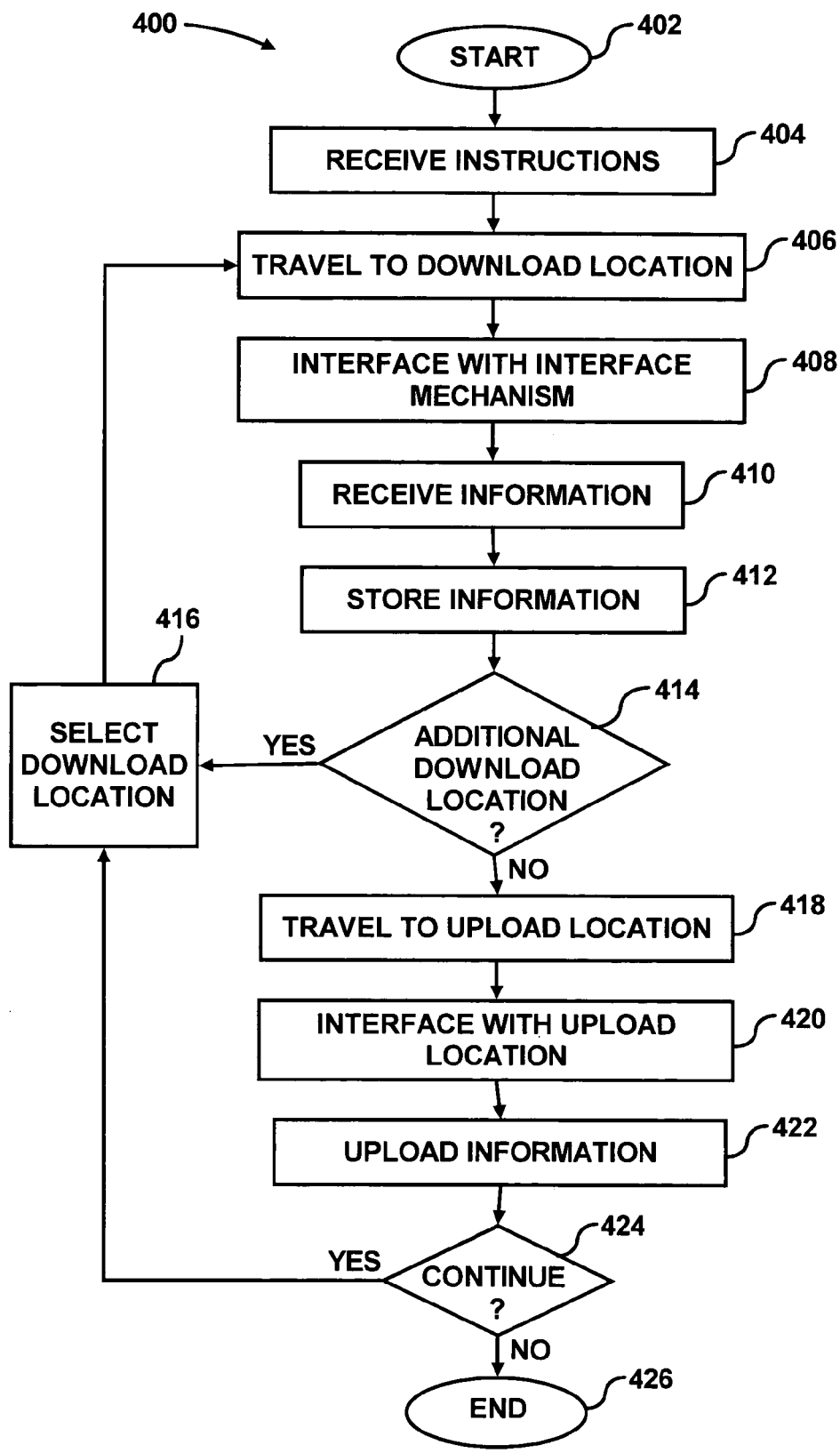
FIG. 4A illustrates an exemplary flow diagram of an operational mode of a method for data collection in a room with a data collector, which may be executed substantially simultaneously with the operational mode depicted in FIG. 3, according to an embodiment of the invention.

FIG. 4A illustrates an exemplary flow diagram of an operational mode 400 of a method for data collection in a room with a data collector, which may be executed substantially simultaneously with the operational mode 300, according to an embodiment of the invention. It is to be understood that the following description of the operational mode 400 is but one manner of a variety of different manners in which an embodiment of the invention may be practiced. It should also be apparent to those of ordinary skill in the art that the operational mode 400 represents a generalized illustration and that other steps may be added or existing steps may be removed, modified or rearranged without departing from the scope of the invention.

The description of the operational mode 400 is made with reference to the block diagram 200 illustrated in FIG. 2, and thus makes reference to the elements cited therein. It should, however, be understood that the operational mode 400 is not limited to the elements set forth in the block diagram 400. Instead, it should be understood that the operational mode 300 may be practiced by a data collection system having a different configuration than that set forth in the block diagram 200.

The operational mode 400 may be initiated in response to a variety of stimuli at step 402. For example, the operational mode 400 may be initiated in response to a predetermined lapse of time, in response to receipt of a transmitted signal, manually initiated, etc. At step 404, the robotic device, for instance, the robotic device 126, 218, may receive instructions to operate in various manners. The instructions may be programmed into the robotic device 218 by either or both of a user or the computer system, for instance, the computer system 130, 244. The programming may comprise, for instance, a map of the room, the locations of the sensor devices A–C 204–208, the locations of data storage devices 228 or interface apparatuses 124, the locations of computer systems 130, 244, the locations of cooling system components 246, etc.

The programming may also include various operations for the robotic device 218 to perform. For instance, the robotic device 218 may be programmed to position various sensor devices A–C 204–208 at various locations in the room (step 302 in FIG. 3). The programming may also comprise a timing schedule for the robotic device 218. More particularly, the robotic device 218 may be programmed to receive information from various sensor devices A–C 204–208 at various times. By way of example, the robotic device 218 may be programmed to receive information more frequently from sensor devices A–C 204–208 located in areas having conditions which have historically been difficult to control. As other examples, the robotic device 218 may be programmed to receive information more frequently from sensor devices A–C 204–208 located in areas of greater criticality, based upon service level agreements, etc.

In addition, or alternatively, the robotic device 218 may be programmed to traverse the room according to a set routine. More particularly, the robotic device 218 may be programmed to receive information from a number of sensor devices A–C 204–208 located at various positions in the room to substantially maximize information retrieval within a predetermined period of time, for instance, according to a Manhattan algorithm. By way of example, the robotic device 218 may be programmed to receive information from less than all of the sensor devices A–C 204–208 in a particular area during a run through the room to reduce the amount of time required to obtain that information.

As another example, the routing algorithm programmed into the robotic device 218 may categorize the sensor devices A–C 204–208 into a plurality of groups. The groups for the sensor devices A–C 204–208 may be selected according to historical data pertaining to the areas associated with the sensor devices A–C 204–208. For instance, in a two category grouping, the routing algorithm may assign those of the sensor devices A–C 204–208 having associated areas where it has been historically difficult to maintain one or more conditions within predetermined ranges in a first group. The others of the sensor devices A–C 204–208 may be assigned to a second group.

The routing algorithm may, for example, devise a route that enables the robotic device 218 to visit those sensor devices A–C 204–208 in the first group first or more frequently than those sensor devices A–C 204–208 in the second group. A more detailed description of manners in which various areas of a room may be categorized into a plurality of groups is described in greater detail in copending and commonly assigned U.S. patent application Ser. No. 10/639,428, filed on Aug. 13, 2003, the disclosure of which is hereby incorporated by reference in its entirety. Additional manners in which the routing algorithm may be implemented to control operations of the robotic device 218 are disclosed in the Ser. No. 10/721,264 application, the disclosure of which is hereby incorporated by reference in its entirety.

In addition, a plurality of robotic devices 218 may be programmed to operate substantially simultaneously to thereby reduce the amount of time required to collect information from the sensor devices. In this regard, the plurality of robotic devices 218 may be assigned to various areas of the room or to operate at various times, for instance, some of the robotic devices 218 may execute the operational mode 400 while others of the robotic devices are recharging their batteries. In addition, the robotic devices may operate as back-ups for other robotic devices 218, for instance, should they malfunction or require maintenance.

In addition to the above, or alternatively, if the data collector 236 comprises a hand-held device useable by a technician, step 404 may comprise instructing the technician. Thus, at step 404, the technician may be instructed to obtain information from various ones of the sensor devices A–C 204–208 and/or data storage devices 228. In addition, the instructions may include the frequency with which the technician obtains information from the sensor devices A–C 204–208 and/or data storage devices 228.

At step 406, based upon the instructions received, the robotic device 218 and/or technician may travel to a download location. For purposes of brevity and clarity of explanation, the locations where information is transferred to the data collector 236, for instance, from the sensor devices A–C 204–208, the data storage devices 228, and/or the interface apparatuses 124, will be referred to as "download locations". In addition, the locations where the information is uploaded from the data collector 236, for instance, to the computer system 244 or to control one or more of the cooling system components 246, will be referred to as "upload locations". The upload locations may include locations where the data collector 236 may be physically interfaced with a network on which the computer system 244 and/or cooling system components 246 may be accessed. In addition, the upload locations may include locations where the data collector 236 may wirelessly communicate with either or both of the computer system 244 and the cooling system components 246.

The data collector 236 may be interfaced with an interface mechanism 216, 234 of a sensor device A 204, a data storage device 228, or interface apparatus 124 at step 408. As described hereinabove, the information may be exchanged through an interface of the data collector 236. At step 408, instructions to the sensor devices A–C 204–208 may be communicated through an interface created via the data collector 236. For instance, the robotic device 218 or technician may program the sensor devices A–C 204–208 as indicated hereinabove at step 306.

At step 410, the data collector 236 may receive information collected by the sensor devices A–C 204–208. As described hereinabove, the information may include the one or more conditions detected by the sensor devices A–C 204–208, the identification of the sensor device A–C 204–208 that detected the one or more conditions, as well as the time at which the information was collected. The received information may be stored in a memory of the data collector 236 or the robotic device 218 at step 412.

At step 414, the robotic device 218 and/or the technician may determine whether it is to receive information from another download location. For the robotic device 218, this determination may be based upon the algorithm or software the robotic device 218 is programmed to execute. If the robotic device 218 determines that it is to receive information from another download location, the robotic device 218 may select another download location at step 416. Again, the selection of the additional download location may be dictated upon its programming. In addition, the robotic device 218 may repeat steps 406-414 until it determines that it is not programmed to receive information from further download locations.

For the technician, this determination may be based on the instructions received at step 404. If the technician is to receive information from another download location, the technician may select another download location at step 416. The selection of another download location may be based upon the instructions received at step 404. Alternatively, this determination may be based upon detected conditions. The technician may repeat steps 406-4014 until the technician determines that he or she has received information from all of the download locations during a particular routine.

If the robotic device 218 and/or the technician determines that it has no further download locations from which it is to receive information, the robotic device 218 and/or technician may travel to an upload location at step 418. The upload location may comprise, for instance, a location where the data collector 236 may be interfaced with the computer system 244. This location may comprise a location in the vicinity of the computer system 244 or it may comprise various locations where the data collector 236 may be interfaced with a network on which the computer system 244 is attached.

At step 422, the information received from the sensor devices A–C 204–208 may be uploaded. In addition, while the data collector 236 is interfaced with the computer system 244, the data collector 236 may also receive and store instructions from the computer system 244. For instance, the computer system 244 may provide instructions related to the collection of information from various sensor devices A–C 204–208, to various routes to be followed in receiving information, to the operations of the sensor devices A–C 204–208 which may be transferred to the sensor devices A–C 204–208, etc.

The computer system 244 may determine whether to manipulate one or more cooling system components 246 in response to the information received from the data collector 236. Manners in which the computer system 244 may operate the one or more cooling system components 246 are described, for instance, in the co-pending Ser. No. 10/721,264 application, the disclosure of which is hereby incorporated by reference in its entirety.

At step 424, the robotic device 218 and/or technician may determine whether it is to continue the operational mode 400. Again, this determination may be based upon the algorithm executed by the robotic device 218 or the instructions received by the technician. If the robotic device 218 and/or technician determines that the operational mode 400 is to continue, the robotic device 218 and/or technician may select another download location at step 416 and repeat steps 406–424. If it is determined that the operational mode 400 is to be discontinued, for instance, a time period expires, the components in the room are powered down, the operational mode 400 is manually discontinued, etc., the robotic device 218 and/or the technician may end the operational mode 400 as indicated at step 426. Step 426 may be similar to an idle mode for the operational mode 400 since the operational mode 400 may be reactivated, for instance, when the components of the room become activated, after a predetermined period of time, in response to manual input to reactivate the operational mode 400, etc.

Figure 4B:
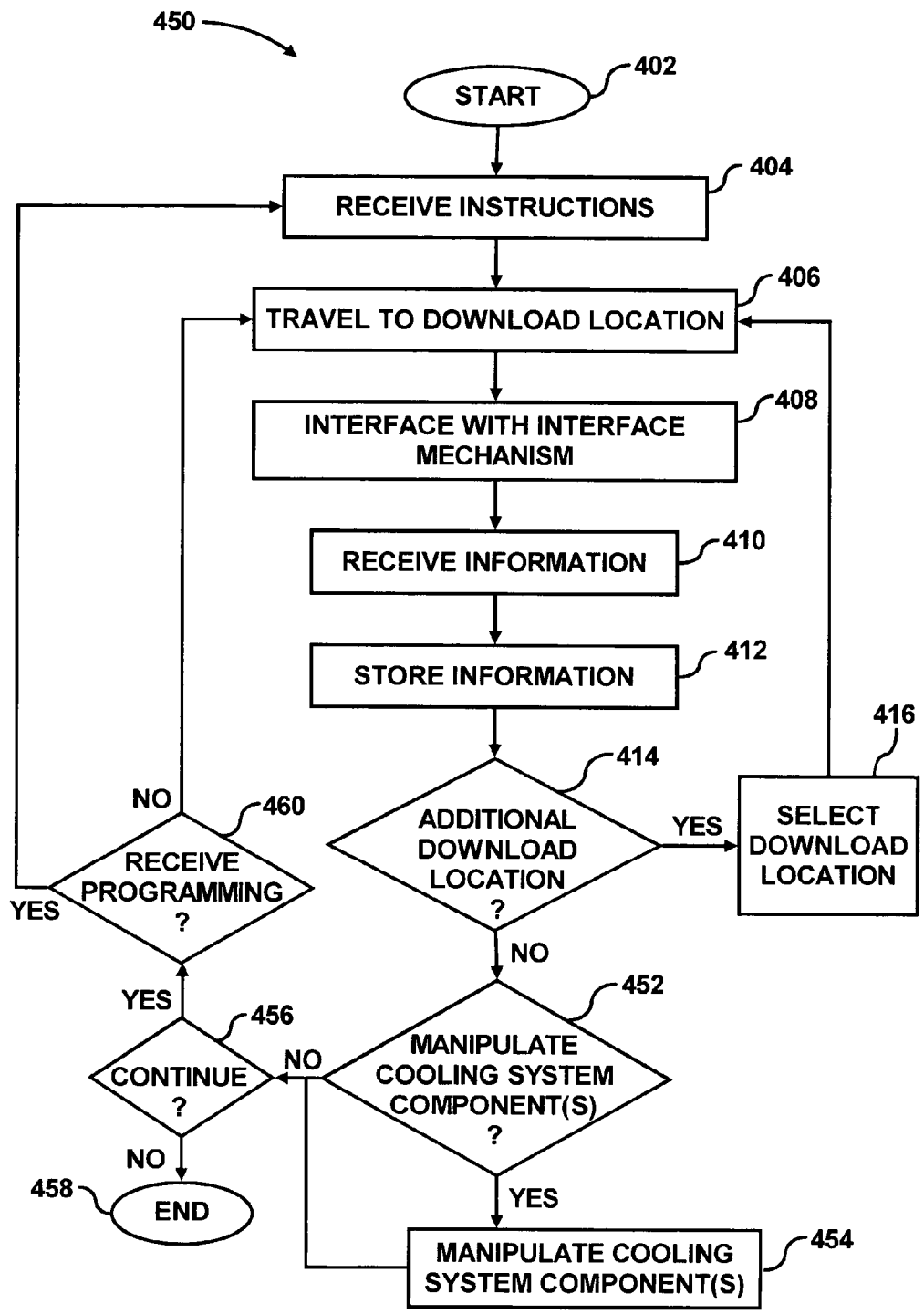
FIG. 4B illustrates an exemplary flow diagram of an operational mode of a method for data collection in a room with a data collector, which may be executed substantially simultaneously with the operational mode depicted in FIG. 3, according to another embodiment of the invention.

FIG. 4B illustrates an exemplary flow diagram of an operational mode 450 of a method for data collection in a room with a data collector, which may be executed substantially simultaneously with the operational mode 300, according to another embodiment of the invention. It is to be understood that the following description of the operational mode 450 is but one manner of a variety of different manners in which an embodiment of the invention may be practiced. It should also be apparent to those of ordinary skill in the art that the operational mode 450 represents a generalized illustration and that other steps may be added or existing steps may be removed, modified or rearranged without departing from the scope of the invention.

Steps 402–416 in the operational mode 450 are identical to steps 402–416 in the operational mode 400. Accordingly, detailed descriptions of these steps are omitted for purposes of brevity.

The steps outlined in the operational mode 450 pertain to the situation where the robotic device 218 is configured to control the one or more cooling system components. With reference first, therefore, to step 452, the robotic device 218 is configured to determine whether one or more cooling system components 246 are to be manipulated. Manners in which the robotic device 218 may make these determinations are set forth in greater detail in the co-pending Ser. No. 10/721,264 application, the disclosure of which is hereby incorporated by reference in its entirety.

If the robotic device 218 determines, based upon the information received from the sensor devices A–C 204–208, that one or more of the cooling system components 246 require manipulation, the robotic device 218 may manipulate the one or more cooling system components 246 at step 454. The manipulation of the cooling system component(s) 246 may be performed manually or through transmission of instructions to controllers configured to operate the cooling system component(s) 246. For instance, if the robotic device 218 is configured to manually manipulate the cooling system component(s) 246, the robotic device 218 may travel to a vicinity of the cooling system component(s) 246 and may use its arm assembly 132 and manipulator 134 to manually adjust or manipulate the cooling system component(s) 246. By way of example, if the cooling system component(s) 246 comprises a vent tile, the robotic device 218 may be configured to manually adjust the vent tile, for instance, by repositioning the vanes in the vent tile. As another example, if the cooling system component(s) 246 comprises a CRAC unit, the robotic device 218 may be configured to manually adjust the settings on the CRAC unit.

If the robotic device 218 is configured to transmit instructions to the cooling system component(s) 246, the robotic device 218 may be configured to either transmit the instructions through a wired or wireless connection with the cooling system component(s) 246. If the robotic device 218 is configured to communicate with the cooling system component(s) 246 through a wired connection, the robotic device 218 may travel to an upload location where it may connect to a network on which the cooling system component(s) 246 are attached to transmit the instructions. Otherwise, the robotic device 246 may travel to a vicinity of the cooling system component(s) 246 to communicate its instructions. If the robotic device 218 is configured to communicate with the cooling system component(s) 246 through a wireless connection, the robotic device 218 may travel to various areas of the room where it may be within range of the cooling system component(s) 246 to communicate its instructions wirelessly.

In any event, after the robotic device 218 has manipulated the cooling system component(s) 246 at step 454 or if the robotic device 218 determines that the cooling system component(s) 246 do not require manipulation at step 452, the robotic device 218 may determine whether to continue the operational mode 450 at step 456. If the robotic device 218 determines that the operational mode 450 is to be discontinued, for instance, a time period expires, the components in the room are powered down, the operational mode 450 is manually discontinued, etc., the robotic device 218 may end the operational mode 450 as indicated at step 458. Step 458 may be similar to an idle mode for the operational mode 450 since the operational mode 450 may be reactivated, for instance, when the components of the room become activated, after a predetermined period of time, in response to manual input to reactivate the operational mode 450, etc.

If the robotic device 218 determines that the operational mode 450 is to continue, the robotic device 218 may determine whether it requires additional programming at step 460. If the robotic device 218 determines that it requires additional programming, the robotic device 218 may receive programming either manually or from the computer system 244 at step 404 and steps 406–414, and 452–460 may be repeated. If the robotic device 218 determines that it does not require additional programming at step 460, the robotic device 218 may repeat steps 406–414, 452–460.

The operations set forth in the operational modes 300, 400, 450 may be contained as a utility, program, or subprogram, in any desired computer accessible medium. In addition, the operational modes 300, 400, 450 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

FIG. 5 illustrates an exemplary computer system 500, according to an embodiment of the invention. The computer system 500 may include, for example, the device controller 238 and/or the computer system 244. In this respect, the computer system 500 may be used as a platform for executing one or more of the functions described hereinabove with respect to the various components of the collection system 202.

The computer system 500 includes one or more controllers, such as a processor 502. The processor 502 may be used to execute some or all of the steps described in the operational modes 400 and 450. Commands and data from the processor 502 are communicated over a communication bus 504. The computer system 500 also includes a main memory 506, such as a random access memory (RAM), where the program code for, for instance, the device controller 238 and/or the controller of the computer system 244, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the provisioning system may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, e.g., the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (e.g., user input devices, secondary memory, etc.).

By virtue of certain embodiments of the invention, a plurality of relatively inexpensive sensor devices are implemented to collect information pertaining to one or more conditions in a room. In addition, a robotic device is employed to collect the information from the sensor devices and convey the collected information to a computer system that may operate as an energy manager. More particularly, a robotic device operates as a means of conveying information from various locations of the room to other locations of the room. In this regard, the robotic device is designed to generally enable secure and effective communication of information between the various components in the room. Therefore, for instance, data need not be transmitted across relatively large distances for the information to be received by, for instance, a computer system configured to control operations of various components in the room.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A system for collecting data in a room, said system comprising:
    a plurality of sensor devices positioned at various locations in the room;
    at least one data storage device configured to store the detected at least one condition;
    an interface mechanism for enabling communication of the stored at least one condition, wherein the plurality of sensor devices are wired to an interface apparatus comprising the interface mechanism;
    a data collector separate from the plurality of sensor devices for interfacing with the interface mechanism to receive the stored at least one condition from the at least one data storage device; and
    a computer system interfaced with at least one unload location, wherein the data collector is configured to be positioned near the at least one upload location to communicate the stored at least one condition to the computer system through the at least one upload location, and wherein the plurality of sensor devices are not in direct communication with the computer system.

2. The system according to claim 1, wherein the plurality of sensor devices are positioned at various heights on a pole.

3. The system according to claim 2, wherein the pole is positioned on one or more wheels.

4. The system according to claim 2, wherein the data collector is configured on a robotic device having a manipulator configured to grasp and move the pole.

5. The system according to claim 1, wherein the data collector comprises at least one of a hand-held device and a device configured for use by a robotic device.

6. The system according to claim 1, wherein the room comprises one or more racks, wherein the plurality of sensor devices are positioned at various heights along at least one of the one or more racks, and wherein the sensors of the plurality of sensor devices are configured to detect at least one condition of one or both of airflow into and out of the at least one rack at the various heights.

7. The system according to claim 1, wherein at least one of the plurality of sensor devices comprises the at least one data storage device.

8. The system according to claim 7, wherein at least one of the plurality of sensor devices comprises the interface mechanism.

9. The system according to claim 1, wherein the interface apparatus comprises the at least one data storage device and wherein the at least one data storage device is configured to store the at least one condition detected by the plurality of sensor devices.

10. The system according to claim 1, wherein the data collector is positioned on a movable platform on a robotic device, and wherein the data collector is configured to interface a plurality of interface mechanisms located at various distances and heights with respect to the robotic device.

11. The system according to claim 10, wherein the robotic device is configured to control one or more cooling system components based upon the received at least one condition.

12. The system according to claim 10, wherein the plurality of sensor devices are configured to receive instructions from the robotic device through the interface mechanism.

13. The system according to claim 1, wherein the computer system is configured to control one or more cooling system components based upon the at least one condition communicated from the data collector.

14. Tho system according to claim 13, wherein the data collector is configured on a robotic device, said robotic device being configured to travel to the at least one upload location to enable communications between the data collector and the computer system.

15. The system according to claim 14, wherein the robotic device is configured to receive instructions from the computer system through an interface with the upload location.

16. The system according to claim 15, wherein the robotic device is configured to store the at least one condition received from the at least one data storage device, upload the stored at least one condition to the computer system through an interface with the upload location, and wherein the computer system is configured to manipulate the one or more cooling system components in response to the uploaded at least one condition.

17. A method for collecting data in a room, said method comprising:
    positioning a plurality of sensor devices in various locations of the room wherein the plurality of sensor devices are wired to at least one interface apparatus;
    detecting at least one condition with the plurality of sensor devices;
    storing the detected at least one condition in a data storage device;
    interfacing the data storage device with a data collector through the at least one interface apparatus, wherein the data collector is separate from the plurality of sensor devices;
    transferring the at least one condition stored in the data storage device to the data collector;
    moving the data collector to a location near an unload location of a computer system; and
    communicating the at least one condition from the data collector to the computer system through interface with the upload location.

18. The method according to claim 17, wherein the step of positioning the plurality of sensor devices comprises implementing a robotic device to position the plurality of sensor devices in various locations of the room.

19. The method according to claim 18, wherein the step of positioning the plurality of sensor devices comprises positioning the plurality of sensor devices on a pole and moving the pole a location in the room with the robotic device.

20. The method according to claim 17, wherein the room comprises at least one rack housing electronic equipment, and wherein the step of positioning the plurality of sensor devices comprises positioning the positioning sensor devices to detect the at least one condition at various heights of the at least one rack.

21. The method according to claim 17, further comprising:
    programming the plurality of sensor devices to detect the at least one condition at predetermined periods of time.

22. The method according to claim 17, wherein the data collector is positioned on a robotic device, and wherein the step of programming the plurality of sensor devices comprises programming the plurality of sensor devices through an interface between the plurality of sensor devices and the data collector.

23. The method according to claim 17, further comprising:
    tracking the locations of the plurality of sensor devices; and
    storing the locations of the plurality of sensor devices.

24. The method according to claim 23, wherein the data collector is positioned on a robotic device, said method further comprising:
    programming the robotic device with the locations of the plurality of sensor devices and a routing algorithm, wherein the routing algorithm is configured to determine a route for the robotic device to follow in traversing the room.

25. The method according to claim 24, wherein the step of programming the robotic device comprises interfacing the robotic device with a computer system configured to provide instructions to the robotic device.

26. The method according to claim 24, further comprising:
    maneuvering the robotic device to a download location having the interface mechanism according to the routing algorithm;
    interfacing the robotic device with the interface mechanism, wherein the step of transferring the stored at least one condition to the robotic device comprises transferring the stored at least one condition through the interface mechanism; and
    storing the transferred at least one condition in the robotic device.

27. The method according to claim 26, further comprising:
    interfacing the data collector with the upload location; and
    uploading the stored at least one condition to the computer system.

28. The method according to claim 27, further comprising:
    in the computer system, manipulating one or more cooling system components based upon the detected at least one condition.

29. The method according to claim 27, further comprising:
    maneuvering the robotic device to an upload location, said upload location enabling communications with the computer system.

30. The method according to claim 26, further comprising:
    in the robotic device, manipulating one or more cooling system components based upon the detected at least one condition.

31. A system for collecting data in a room, said system comprising:
    means for positioning a plurality of means for detecting at least one condition in various locations of the room;
    means for storing the at least one condition detected by the means for detecting;
    means for interfacing the means for storing with a data collector, wherein the means for interfacing is wired to the plurality of means for detecting, and wherein the data collector is separate from the plurality of means for detecting at least one condition;

means for transferring the stored at least one condition to the data collector; and means for communicating the at least one condition from the data collector to a means the controlling at least one environmental condition in the room, wherein the plurality of means for detecting at least one condition is not in direct communication with the means for controlling at least one environmental condition in the room.

32. The system according to claim 31, wherein the means for positioning comprises a robotic device.

33. The system according to claim 31, further comprising:
a robotic device comprising;
means for determining the locations of the means for interfacing; and
means for maneuvering the robotic device to the locations of the means for interfacing.

34. The system according to claim 33, further comprising:
means for controlling one or more cooling system components, wherein the means for maneuvering is configured to maneuver the robotic device to an upload location of the means for controlling.

35. The system according to claim 34, wherein the means for controlling comprises means for interfacing with the robotic device and means for programming the robotic device.

36. The system according to claim 33, wherein the robotic device comprises means for programming the means for detecting.

37. A computer readable storage medium on which is embedded one or more computer programs, said one or more computer programs implementing a method for collecting data in a room, said one or more computer programs comprising a set of instructions for;
detecting at least one condition with a plurality of sensor devices, said plurality of sensor devices being wired to at least one interface apparatus;
storing the detected at least one condition in a data storage device;
interfacing the data storage device with a data collector through the at least one interface apparatus, wherein the data collector is separate from the plurality of sensor devices;
transferring the stored at least one condition to the data collector;
moving the data collector to a location near an upload location of a computer system; and
communicating the at least one condition from the data collector to the computer system through interface with the unload location.

38. The computer readable storage medium according to claim 37, said one or more computer programs further comprising a set of instructions for:
programming the plurality of sensor devices to detect the at least one condition at predetermined periods of time.

39. The computer readable storage medium according to claim 38, said one or more computer programs further comprising a set of instructions for:
programming the plurality of sensor devices through an interface between the plurality of sensor devices and the data collector.

40. The computer readable storage medium according to claim 37, said one or more computer programs further comprising a set of instructions for;
tracking the locations of the plurality of sensor devices; and
storing the locations of the plurality of sensor devices.

41. The computer readable storage medium according to claim 40, said one or more computer programs further comprising a set of instructions for:
programming a robotic device with the locations of the plurality of sensor devices and a routing algorithm, wherein the routing algorithm is configured to determine a route for the robotic device to follow in traversing the room.

42. The computer readable storage medium according to claim 41, said one or more computer programs further comprising a set of instructions for:
maneuvering the robotic device to a download location having the interface mechanism according to the routing algorithm;
interfacing the robotic device with the interface mechanism, wherein the step of transferring the stored at least one condition to the robotic device comprises transferring the stored at least one condition through the interface mechanism; and
storing the transferred at least one condition in the robotic device.

43. The computer readable storage medium according to claim 42, said one or more computer programs further comprising a set of instructions for:
maneuvering the robotic device to an upload location, said upload location enabling communications with the computer system.

44. The computer readable storage medium according to claim 42, said one or more computer programs further comprising a set of instructions for:
in the robotic device, manipulating one or more cooling system components based upon the detected at least one condition.

45. The computer readable storage medium according to claim 37, said one or more computer programs further comprising a set of instructions for:
interfacing the data collector with an upload location; and
uploading the stored at least one condition to a computer system.

46. The computer readable storage medium according to claim 45, said one or more computer programs further comprising a set of instructions for:
in the computer system, manipulating one or more cooling system components based upon the detected at least one condition.

* * * * *

UNITED STATES PATENT AND TRADEMARK OFFICE
CERTIFICATE OF CORRECTION

PATENT NO. : 7,086,603 B2 Page 1 of 1
APPLICATION NO. : 10/772318
DATED : August 8, 2006
INVENTOR(S) : Cullen E. Bash et al.

It is certified that error appears in the above-identified patent and that said Letters Patent is hereby corrected as shown below:

In column 10, line 52, delete "No." and insert -- and --, therefor.

In column 26, line 31, in Claim 1, delete "unload" and insert -- upload --, therefor.

In column 27, line 16, in Claim 14, delete "Tho" and insert -- The --, therefor.

In column 27, line 36, in Claim 17, after "room" insert -- , --.

In column 27, line 48, in Claim 17, delete "unload" and insert -- upload --, therefor, In column 29, line 4, in Claim 31, after "means" delete "the" and insert -- for --, therefor.

In column 29, line 33, in Claim 37, delete "for;" and insert -- for: --, therefor.

In column 29, line 48, in Claim 37, delete "unload" and insert -- upload --, therefor.

In column 30, line 3, in Claim 40, delete "for;" and insert -- for: --, therefor.

Signed and Sealed this

Eleventh Day of August, 2009

David J. Kappos
*Director of the United States Patent and Trademark Office*